(12) United States Patent
Kalibjian et al.

(10) Patent No.: US 7,996,680 B2
(45) Date of Patent: Aug. 9, 2011

(54) SECURE DATA LOG MANAGEMENT

(75) Inventors: Jeff Kalibjian, Cupertino, CA (US);
Susan Langford, Cupertino, CA (US);
Vladimir Libershteyn, Cupertino, CA (US); Larry Hines, Cupertino, CA (US);
Steve Wierenga, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1178 days.

(21) Appl. No.: 11/527,791

(22) Filed: Sep. 27, 2006

(65) Prior Publication Data

US 2008/0126429 A1    May 29, 2008

(51) Int. Cl.
*H04L 9/32* (2006.01)

(52) U.S. Cl. ........ 713/176; 713/180; 713/182; 713/185; 726/5; 726/6; 726/18; 726/19

(58) Field of Classification Search .................. None
See application file for complete search history.

(56) References Cited

U.S. PATENT DOCUMENTS

| 6,311,271 | B1 * | 10/2001 | Gennaro et al. | 713/170 |
|---|---|---|---|---|
| 6,378,072 | B1 | 4/2002 | Collins | |
| 6,895,507 | B1 * | 5/2005 | Teppler | 726/19 |
| 7,222,157 | B1 * | 5/2007 | Sutton et al. | 709/206 |
| 7,360,090 | B1 * | 4/2008 | Doskow et al. | 713/170 |
| 7,549,064 | B2 | 6/2009 | Elbert | |
| 2002/0166064 | A1 * | 11/2002 | Harrison | 713/200 |
| 2003/0163704 | A1 * | 8/2003 | Dick et al. | 713/178 |
| 2006/0026211 | A1 * | 2/2006 | Potteiger | 707/200 |
| 2006/0130154 | A1 * | 6/2006 | Lam et al. | 726/30 |
| 2007/0011736 | A1 | 1/2007 | Kalibjian | |

* cited by examiner

*Primary Examiner* — Taghi T Arani
*Assistant Examiner* — Amir Mehrmanesh

(57) ABSTRACT

In one embodiment a secure computer system comprises a processor and a memory module including logic instructions stored on a computer readable medium which, when executed by the processor, the logic instructions configure the processor to receive, in a secure computing environment, a portion of a data log from an application operating outside the secure computing environment, and when the portion of the data log exceeds a size threshold, to assign a timestamp to the portion of the data log, assign an identifier to the portion of the data log, create a digital signature load block comprising the portion of the data log, the timestamp, and the identifier, and store the digital signature load block in a memory module.

23 Claims, 5 Drawing Sheets

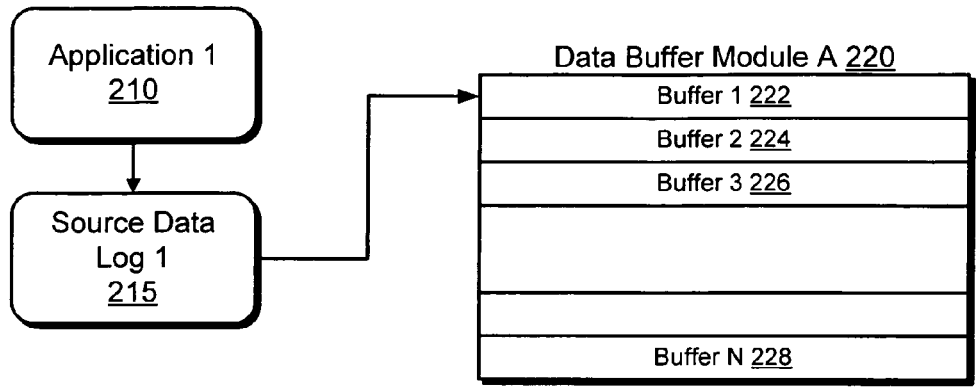

Fig. 2

| |
|---|
| Digital Signature Load N<br>Time 10:02:05 March 4, 2006<br>ID: J<br>10:00:00 March 4, 2006 xxxxx<br>10:00:01 March 4, 2006 xxxxx<br>. . . .<br>10:00:04 March 4, 2006 xxxxx |
| Digital Signature Load N+1<br>Time 10:07:10 March 4, 2006<br>ID: J+1<br>10:01:05 March 4, 2006 xxxxx<br>10:01:06 March 4, 2006 xxxxx<br>. . . .<br>10:06:30 March 4, 2006 xxxxx |
| Digital Signature Load N+2<br>Time 10:07:10 March 4, 2006<br>ID: J+2<br>10:06:31 March 4, 2006 xxxxx<br>10:06:32 March 4, 2006 xxxxx<br>. . . .<br>10:07:40 March 4, 2006 xxxxx |
| Digital Signature Load N+2<br>Time 10:10:40 March 4, 2006<br>ID: J+3<br>10:07:41 March 4, 2006 xxxxx<br>10:07:42 March 4, 2006 xxxxx<br>. . . .<br>10:09:32 March 4, 2006 xxxxx |

Fig. 4

SECURE DATA LOG MANAGEMENT

TECHNICAL FIELD

This application relates to electronic computing, and more particularly to secure data log management.

BACKGROUND

Computer system security remains an important issue. As computer networks expand, the opportunity for malicious attacks on computer systems expands concomitantly. Hence, additional computer security techniques are desirable.

BRIEF DESCRIPTION OF THE DRAWINGS

FIG. 2 is a schematic illustration of data flows in a computing system configured to implement secure data log management.

FIG. 4 is a schematic illustration of one embodiment of a series of digital signature load blocks in a computing system for secure data log management.

DETAILED DESCRIPTION

Described herein are exemplary systems and methods for secure data log management. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
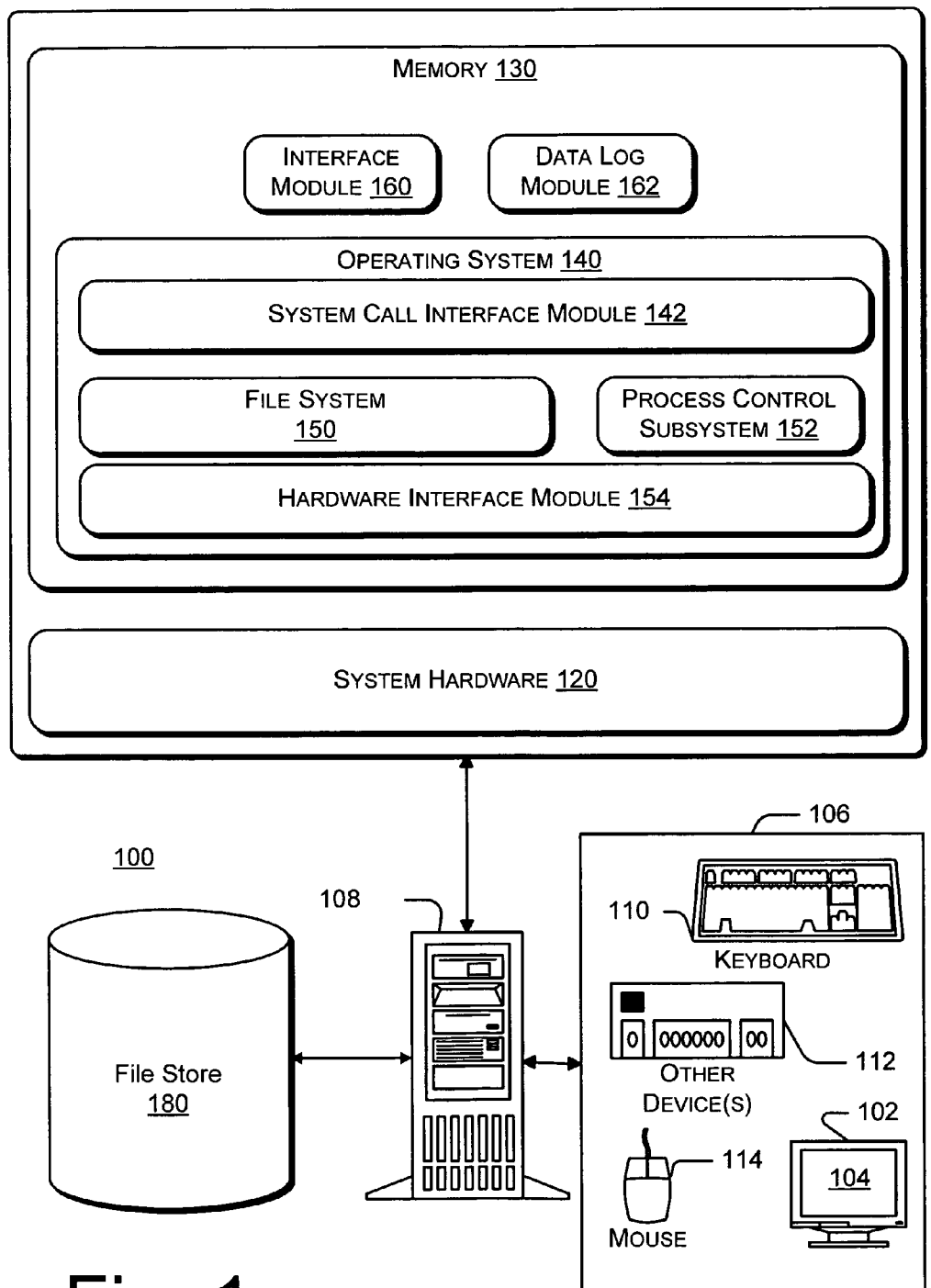
FIG. 1 is a schematic illustration of one embodiment of a computing system configured to implement secure data log management.

FIG. 1 is a schematic illustration of an exemplary computer system 100 adapted to perform secure data log management. The computer system 100 includes a computer 108 and one or more accompanying input/output devices 106 including a display 102 having a screen 104, a keyboard 110, other I/O device(s) 112, and a mouse 114. The other device(s) 112 can include a touch screen, a voice-activated input device, a track ball, and any other device that allows the system 100 to receive input from a developer and/or a user. The computer 108 includes system hardware 120 and random access memory and/or read-only memory 130. A file store 180 is communicatively connected to computer 108. File store 180 may be internal such as, e.g., one or more hard drives, or external such as, e.g., one or more external hard drives, network attached storage, or a separate storage network.

Memory 130 includes an operating system 140 for managing operations of computer 108. In one embodiment, operating system 140 includes a hardware interface module 154 that provides an interface to system hardware 120. In addition, operating system 140 includes a file system 150 that manages files used in the operation of computer 108 and a process control subsystem 152 that manages processes executing on computer 108. Operating system 140 further includes a system call interface module 142 that provides an interface between the operating system 140 and one or more application modules and/or libraries.

In operation, one or more application modules and/or libraries executing on computer 108 make calls to the system call interface module 142 to execute one or more commands on the computer's processor. The system call interface module 142 invokes the services of the file system 150 to manage the files required by the command(s) and the process control subsystem 152 to manage the process required by the command(s). The file system 150 and the process control subsystem 152, in turn, invoke the services of the hardware interface module 154 to interface with the system hardware 120.

The particular embodiment of operating system 140 is critical to the subject matter described herein. Operating system 140 may be embodied as a POSIX compliant operating system with secure memory partitions and mandatory access controls. For example, the operating system that may be Common Criteria certified to evaluation levels of 5 or higher against established Common Criteria operating system protection profiles.

In one embodiment, computer system 100 implements a secure computing environment. For example, computer system 100 may implement trust methodologies that comply with level 3 or level 4 of the Federal Information Processing Standards Publications (FIPS PUBS) 140-1 and 140-2 issued by the National Institute of Standards and Technology as described in patent application Ser. No. 11/125,458, now U.S. Pat. No. 7,549,064, entitled, Secure Circuit Assembly, filed May 10, 2005, the disclosure of which is hereby incorporated by reference in its entirety. The system may also implement a secure initialization paradigm described in commonly assigned U.S. Pat. No. 6,378,072, the disclosure of which is also incorporated herein by reference in its entirety.

In one embodiment a trusted cryptographic application layer runs on top of a secure operating system to provide security services the secure data log collection application will utilize as described in patent application Ser. No. 11/177,715 entitled, Policy Based Cryptographic Application Programming Interface Deployed in Secure Memory, filed Jul. 8, 2005 (U.S. Patent Publication No. 2007/0011736), the disclosure of which is hereby incorporated by reference in its entirety.

Operation of one embodiment of a system for secure data log management will be explained with reference to FIGS. 2-5. FIG. 2 is a schematic illustration of data flows in a computing system configured to implement secure data log management. Referring to FIG. 2, an application 210 generates a source data log 215. Application 210 may execute within computing system 100 or may execute on a remote computing system coupled to computing system 100 via a communication network. Application 210 and source data log 215 may be implemented as any type of application that generates a data log. The particular details of application 210 and source data log 215 are beyond the scope of this disclosure.

Data from data log 215 is delivered to data buffer module 220 over a communication network via any suitable transport protocol (e.g., HTTP, FTP, etc.) and may be encrypted using one or more encryption techniques such as, e.g., IPSec, TLS, or the like. FIG. 2 shows a single application 210 generating a single source data log 215. In practice, any number of applications may generate one or more source data logs, which may be delivered to data buffer module 220.

Figure 3:
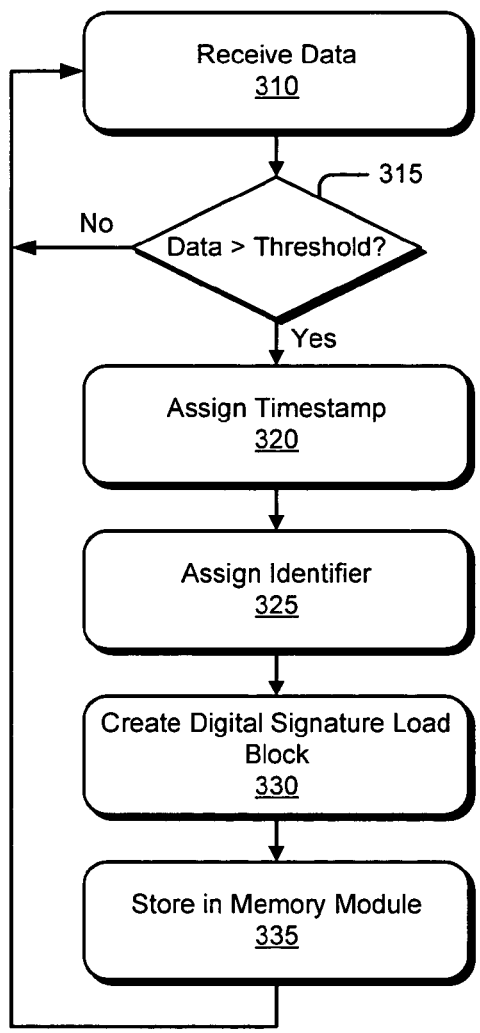
FIG. 3 is a flowchart illustrating operations in one embodiment of a system for secure data log management.

Data from the source data log 215 is received via an interface module 160 of computer system 100. Interface module 160 may manage input/output operations with data buffer module 220. Received data may be operated upon by data log module 162. FIG. 3 is a flowchart illustrating operations implemented by data log module 162 in one embodiment of a system for secure data log management. In one embodiment the interface module 160 and the data log module 162 may be located inside the certified FIPS 140-2 boundary.

Referring to FIG. 3, at operation 310 a data stream from a source data log such as source data log 215 is received. In some embodiments the data from data log 215 may be pushed to computing system 100. In alternate embodiments, computing system 100 may need to pull data from data log 215.

In some embodiments, data log module 162 may implement one or more pre-processing operations. For example, if the data received is encrypted, then data log module 162 may implement a decryption operation to decrypt the received data. Data log module accumulates received data in a suitable memory location.

If, at operation 315, the amount of data received fails to exceed a threshold, then control passes back to operation 310 and the data log module 162 continues to receive data. In some embodiments the threshold may be a static threshold that corresponds to an amount of data that can be packaged into a digital signature load block. In alternate embodiments, the threshold may be a dynamic value.

By contrast, when the amount of data exceeds the threshold, control passes to operation 320 and a timestamp is assigned to the received data. In one embodiment the time apparatus is also maintained inside the FIPS 140-2 boundary such that the time stamp is a trusted time-stamp. At operation 325 an identifier is assigned to the received data, and at operation 330 a digital signature load block is created. In one embodiment creating a digital signature load block may include obtaining a digital signature for the load block. The digital signature may be generated locally, on the hardware that is inside the FIPS 140-2 boundary. The timestamp assigned in operation 320 must represent a time at which the digital signature is generated, and the identifier generated in operation 325 may be implemented as an integer counter that indicates the position of the digital signature load block in a sequence of digital signature load blocks. After each digital signature is applied to a block, the counter is incremented by the integer one. This insures that when blocks are retrieved that deleted blocks can be detected. Observe that the data in the load block may be encrypted with a symmetric encryption algorithm (e.g. Triple DES, AES, etc.) before the digital signature is applied.

At operation 335 the digital signature load block is stored in a memory module. Because a digital signature has already been applied to this data, this memory module (disk, etc) does not have to be inside the FIPS 140-2 boundary. To further secure computing system 100, operating system 140 may be implemented in compliance with a Common Criteria Evaluation Assurance Level (EAL) 5+, which implements memory partitions that prevent applications using the operating system from compromising other applications running on the operating system.

Thus, the computing system 100 may maintain one or more data buffer modules 220, each of which includes a plurality of data buffers, i.e., buffer 1, 222, buffer 2, 224, buffer 3, 226, up to buffer N 228. When the computer system 100 receives an incremental data log (i.e., 215) the system 100 stores this data in a temporary buffer inside the secure boundary. The schematic illustration depicted in FIG. 2 demonstrates a single source data log and a single buffer. In alternate embodiments the computer system 100 may accommodate additional source data logs. For example, assume the computer system 100 collects data from three log sources. Each of the log sources will incrementally produce a data log 215, which will each be stored in a different memory buffer module.

When a buffer threshold is reached (the threshold may be different for each source) a count and timestamp are generated and the digital signature is applied to the buffer entries, timestamp and count, which become one load block for that source. The load block can then be written into a database on disk (i.e., digital signature and data in Buffer-A-1, Buffer-A-2, Buffer-A-N). After that action the incremental buffers may be erased to accommodate new incremental data.

FIG. 4 is a schematic illustration of one embodiment of a series of digital signature load blocks, such as may be created by the operations of FIG. 3, in a computing system for secure data log management. Referring briefly to FIG. 4, each digital signature load block include a timestamp that indicates a time at which the digital signature was generated, an identifier that may be implemented as an integer counter that indicates the position of the digital signature load block in a sequence of digital signature load blocks. Each digital signature load block includes one or more data entries that include data from a source data log such as source data log 215. Each data entry also includes a timestamp that indicates a time at which the data was generated and an integer count. Each data entry may also be encrypted before the digital signature is applied.

Figure 5:
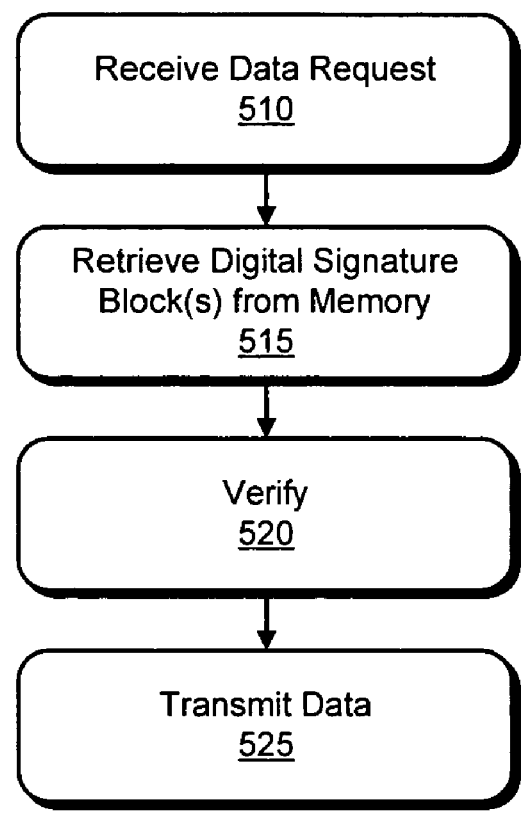
FIG. 5 is a flowchart illustrating operations in one embodiment of a system for secure data log management.

Once the digital signature load blocks are stored in the memory module, the data associated with the digital signature data blocks may be used by one or more applications executing on computing system 100 or on a remote computing system coupled to computing system 100. FIG. 5 is a flowchart illustrating operations in one embodiment of a system for secure data log management. In one embodiment, the operations of FIG. 5 may be implemented by the data log module 162.

Referring to FIG. 5, at operation 510 a request for data stored in the secure data buffer module 220 is received in the computing system 100. The request may be initiated one or more applications executing on computing system 100 or on a remote computing system coupled to computing system 100.

At operation 515 one or more digital signature blocks that contain the requested data of interest may be retrieved from memory, i.e., from the data buffer module 220. At operation 520 one or more of the digital signature blocks and the data in the signature blocks may be verified. Verification may include confirming that digital signature blocks retrieved from data log 220 are in the correct sequence order and that in the span of blocks retrieved there are no gaps in sequence numbers (which would indicate detection of a block deletion), for example by comparing the identifiers associated with the respective digital signature loads. At operation 525 the retrieved data may be transferred to the requesting entity. In some embodiments, the retrieved data may be encrypted before the data is transmitted to requesting entity, in which case the requesting entity may be required to authenticate itself to the computer system 100. In the event that contents of the data blocks are already encrypted, such encryption for transfer would not be necessary. Verification of the digital signature may occur inside the FIPS 140-2 boundary. Evaluation of the unique identifiers on the span of data blocks should also be performed in the FIPS 140-2 boundary.

Exemplary Computing Environment

Some embodiments discussed herein may include various operations performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Figure 6:
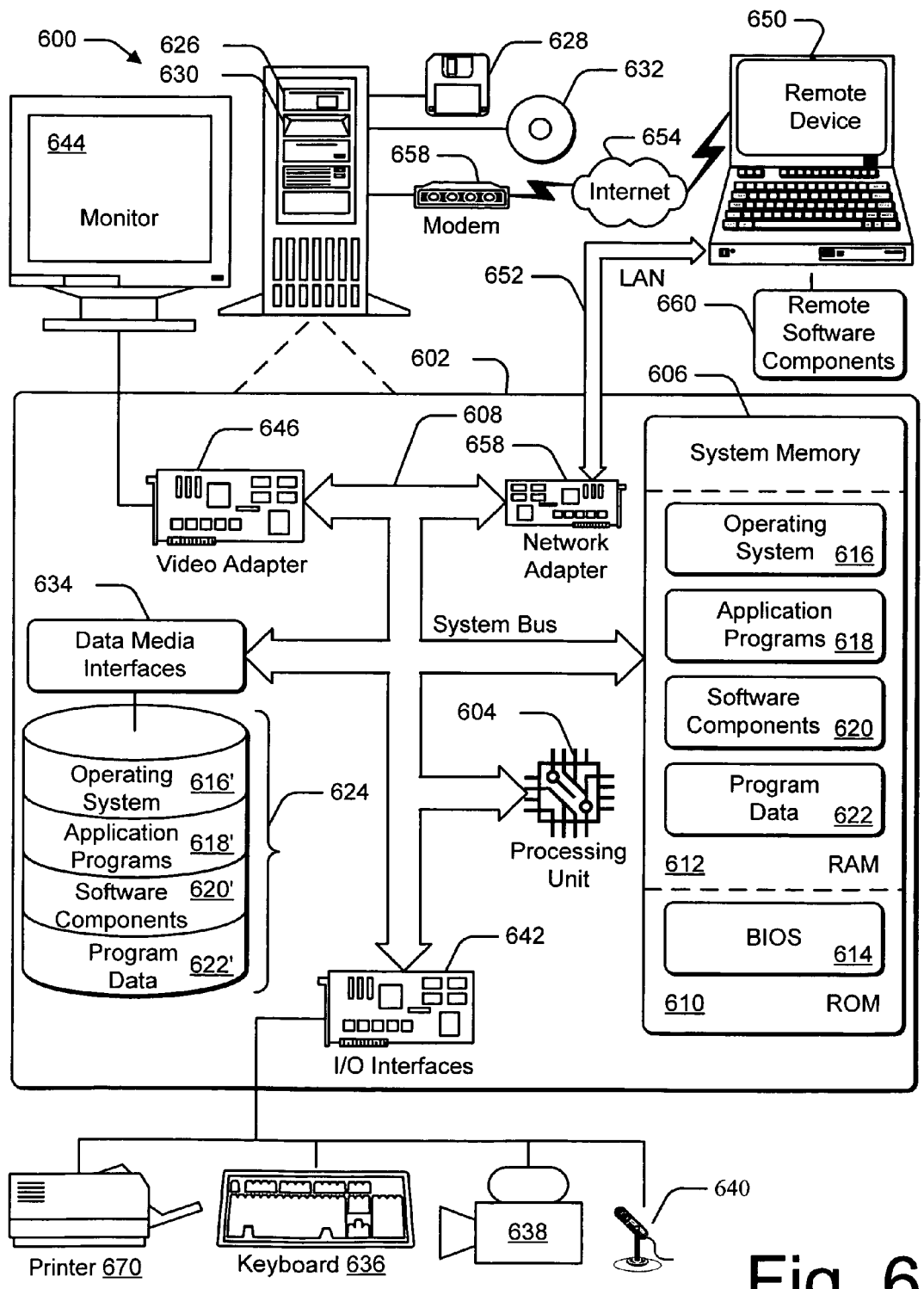
FIG. 6 is a schematic illustration of an exemplary computing environment.

The various components and functionality described herein are implemented with a number of individual computers. FIG. 6 shows components of typical example of such a computer, referred by to reference numeral 600. Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 6, the components of computer 600 may include, but are not limited to, a processing unit 604, a system memory 606, and a system bus 608 that couples various system components including the system memory 606 to the processing unit 604. The system bus 608 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 600 typically includes a variety of computer-readable media. Computer-readable media can be any available media that can be accessed by computer 600 and includes both volatile and nonvolatile media, removable and non-removable media. By way of example, and not limitation, computer-readable media may comprise computer storage media.

"Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 600.

The system memory 606 includes computer storage media in the form of volatile and/or nonvolatile memory such as read only memory (ROM) 610 and random access memory (RAM) 612. A basic input/output system 614 (BIOS), containing the basic routines that help to transfer information between elements within computer 600, such as during start-up, is typically stored in ROM 610. RAM 612 typically contains data and/or program modules that are immediately accessible to and/or presently being operated on by processing unit 604. By way of example, and not limitation, FIG. 6 illustrates operating system 616, application programs 618, other software components 620, and program data 622.

The computer 600 may also include other removable/non-removable, volatile/nonvolatile computer storage media. By way of example only, the computer system of FIG. 6 may include a hard disk drive 624 that reads from or writes to non-removable, nonvolatile magnetic media, a magnetic disk drive 626 that reads from or writes to a removable, nonvolatile magnetic disk 628, and an optical disk drive 630 that reads from or writes to a removable, nonvolatile optical disk 632 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 624 is typically connected to the system bus 608 through a non-removable memory interface such as data media interface 634, and magnetic disk drive 626 and optical disk drive 630 are typically connected to the system bus 608 by a removable memory interface.

The drives and their associated computer storage media discussed above and illustrated in FIG. 6 provide storage of computer-readable instructions, data structures, program modules, and other data for computer 600. In FIG. 6, for example, hard disk drive 624 is illustrated as storing operating system 616', application programs 618', software components 620', and program data 622'. Note that these components can either be the same as or different from operating system 616, application programs 618, software components 620, and program data 622. Operating system 616, application programs 618, other program modules 620, and program data 622 are given different numbers here to illustrate that, at a minimum, they are different copies. A user may enter commands and information into the computer 600 through input devices such as a keyboard 636 and pointing device 638, commonly referred to as a mouse, trackball, or touch pad. Other input devices (not shown) may include a microphone 640, joystick, game pad, satellite dish, scanner, or the like. These and other input devices are often connected to the processing unit 604 through an input/output (I/O) interface 642 that is coupled to the system bus, but may be connected by other interface and bus structures, such as a parallel port, game port, or a universal serial bus (USB). A monitor 644 or other type of display device is also connected to the system bus 606 via an interface, such as a video adapter 646. In addition to the monitor 644, computers may also include other peripheral output devices (e.g., speakers) and one or more printers 670, which may be connected through the I/O interface 642.

The computer may operate in a networked environment using logical connections to one or more remote computers, such as a remote computing device 650. The remote computing device 650 may be a personal computer, a server, a router, a network PC, a peer device or other common network node, and typically includes many or all of the elements described above relative to computer 600. The logical connections depicted in FIG. 6 include a local area network (LAN) 652 and a wide area network (WAN) 654. Although the WAN 654 shown in FIG. 6 is the Internet, the WAN 654 may also include other networks. Such networking environments are commonplace in offices, enterprise-wide computer networks, intranets, and the like.

In some embodiments the computing system 600 may be implemented as a secure computing system. Hence, various components such as, e.g., processor 604, ROM 610 and RAM 612 (and its components operating system 616, application programs 618, software components 620, and program data 622) may be inside a FIPS 140-2 boundary. Further operating system 616 may implement secure memory partitions and access controls such as, e.g., common criteria EAL 5+.

When used in a LAN networking environment, the computer 600 is connected to the LAN 652 through a network interface or adapter 656. When used in a WAN networking environment, the computer 600 typically includes a modem 658 or other means for establishing communications over the Internet 654. The modem 658, which may be internal or external, may be connected to the system bus 606 via the I/O interface 642, or other appropriate mechanism. In a networked environment, program modules depicted relative to the computer 600, or portions thereof, may be stored in the remote computing device 650. By way of example, and not limitation, FIG. 6 illustrates remote application programs 660 as residing on remote computing device 650. It will be appreciated that the network connections shown are exemplary and other means of establishing a communications link between the computers may be used.

Moreover, some embodiments may be provided as computer program products, which may include a machine-readable or computer-readable storage medium having stored thereon instructions used to program a computer (or other electronic devices) to perform a process discussed herein. The machine-readable storage medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method of secure data log management in a computer system, comprising:
   receiving, in a secure computing environment in the computer system, a portion of a data log from a source outside the secure computing environment;
   in response to detecting that a size of the received portion of the data log is less than a size threshold, continue to receive further data of the data log into the portion;
   in response to detecting that the size of the received portion of the data log exceeds the size threshold, the computer system:
      assigning a timestamp to the received portion of the data log;
      assigning an identifier to the received portion of the data log;
      creating a particular digital signature load block comprising the received portion of the data log, the timestamp, and the identifier; and
      storing the particular digital signature load block in a memory module;
   receiving a query for data associated with plural digital signature blocks;
   retrieving the plural digital signature blocks from the memory module; and
   verifying content in the digital signature blocks, wherein the verifying comprises determining that the plural digital signature blocks from the memory module are in a correct sequence order.

2. The method of claim 1, wherein receiving, in the secure computing environment, the portion of the data log from the source outside the secure computing environment comprises receiving data pushed from the source.

3. The method of claim 1, wherein receiving, in the secure computing environment, the portion of the data log from the source outside the secure computing environment comprises pulling data from the source.

4. The method of claim 1, further comprising encrypting the portion of the data log before creating the particular digital signature load block.

5. The method of claim 1, wherein the identifier uniquely identifies the particular digital signature load block and further includes a sequence component that positions the particular digital signature load block in a series of digital signature load blocks.

6. The method of claim 5, wherein the sequence component is an integer counter that indicates the position of the particular digital signature block in the series of digital signature blocks.

7. The method of claim 1,
   wherein the verifying further comprises confirming that no data blocks have been deleted.

8. The method of claim 7,
   wherein receiving the query comprises receiving the query from a requesting entity, the method further comprising:
   in response to the verifying, transmitting the data to the requesting entity.

9. The method of claim 6, further comprising:
   encrypting the data in the plural digital signature blocks before transmitting the data to the requesting entity.

10. The method of claim 1, wherein in response to detecting that the size of the received portion of the data log exceeds the size threshold, the computer system further:
    creating a digital signature of the particular digital signature load block, wherein the timestamp represents a time at which the digital signature was created.

11. A secure computer system, comprising:
a processor;
a computer-readable storage medium storing logic instructions which, when executed by the processor, configure the processor to:
receive, in a secure computing environment, a portion of a data log from an application operating outside the secure computing environment;
in response to detecting that a size of the received portion of the data log is less than a size threshold, continue to receive further data of the data log into the portion;
in response to detecting that the size of the received portion of the data log exceeds the size threshold:
assign a timestamp to the received portion of the data log;
assign an identifier to the received portion of the data log;
create a particular digital signature load block comprising the received portion of the data log, the timestamp, and the identifier; and
store the particular digital signature load block in a memory module;
receive a query for data associated with plural digital signature blocks;
retrieve the plural digital signature blocks from the memory module; and
verify content in the digital signature blocks, wherein the verifying comprises determining that the plural digital signature blocks from the memory module are in a correct sequence order.

12. The computer system of claim 11, wherein the computer-readable storage medium further stores logic instructions which, when executed by the processor, configure the processor to receive data of the data log pushed from the application.

13. The computer system of claim 11, wherein the computer-readable storage medium further stores logic instructions which, when executed by the processor, configure the processor to pull data of the data log from the application.

14. The computer system of claim 11, wherein the computer-readable storage medium further stores logic instructions which, when executed by the processor, configure the processor to encrypt the portion of the data log before creating the particular digital signature load block.

15. The computer system of claim 11, wherein the identifier uniquely identifies the particular digital signature load block and further includes a sequence component that positions the particular digital signature load block in a series of digital signature load blocks.

16. The computer system of claim 15, wherein the sequence component is an integer counter that indicates the position of the particular digital signature block in the series of digital signature blocks.

17. The computer system of claim 11, wherein the verifying further comprises
confirming no data has been deleted from the plural digital signature blocks.

18. The computer system of claim 17, wherein the query is received from a requesting entity, and wherein the computer-readable storage medium further stores logic instructions which, when executed by the processor, configure the processor to:
in response to the verifying, transmit the data to the requesting entity.

19. The computer system of claim 18, wherein the computer-readable storage medium further stores logic instructions which, when executed by the processor, configure the processor to:
encrypt the data in the plural digital signature blocks before transmitting the data to the requesting entity.

20. The computer system of claim 11, wherein in response to detecting that the size of the received portion of the data log exceeds the size threshold, the logic instructions when executed by the processor configure the processor to further:
create a digital signature of the particular digital signature load block, wherein the timestamp represents a time at which the digital signature was created.

21. A non-transitory computer-readable storage medium storing logic instructions which, when executed by a computer processor, configure the processor to:
receive, in a secure computing environment, a portion of a data log from an application operating outside the secure computing environment; and
in response to detecting that a size of the received portion of the data log is less than a size threshold, continue to receive further data of the data log into the portion;
in response to detecting that the size of the received portion of the data log exceeds the size threshold:
assign a timestamp to the received portion of the data log;
assign an identifier to the received portion of the data log;
create a particular digital signature load block comprising the received portion of the data log, the timestamp, and the identifier; and
store the particular digital signature load block in a memory module;
receive, from a requesting entity, a query for data associated with plural digital signature blocks;
retrieve the plural signature blocks from the memory module;
verify that the plural digital signature blocks from the memory module are in a correct sequence order and confirming that no data blocks have been deleted; and
in response to the verifying, transmit the data to the requesting entity.

22. The computer-readable storage medium of claim 21, wherein in response to detecting that the size of the received portion of the data log exceeds the size threshold, the logic instructions when executed by the processor configure the processor to further:
create a digital signature of the particular digital signature load block, wherein the timestamp represents a time at which the digital signature was created.

23. The computer-readable storage medium of claim 21, wherein the identifier is an integer counter that indicates a position of the particular digital signature block in a sequence of digital signature blocks.

* * * * *